No. 888,405. PATENTED MAY 19, 1908.
J. P. LAVIGNE.
MOTOR VEHICLE DRIVING MECHANISM.
APPLICATION FILED JUNE 12, 1907.
2 SHEETS—SHEET 1.
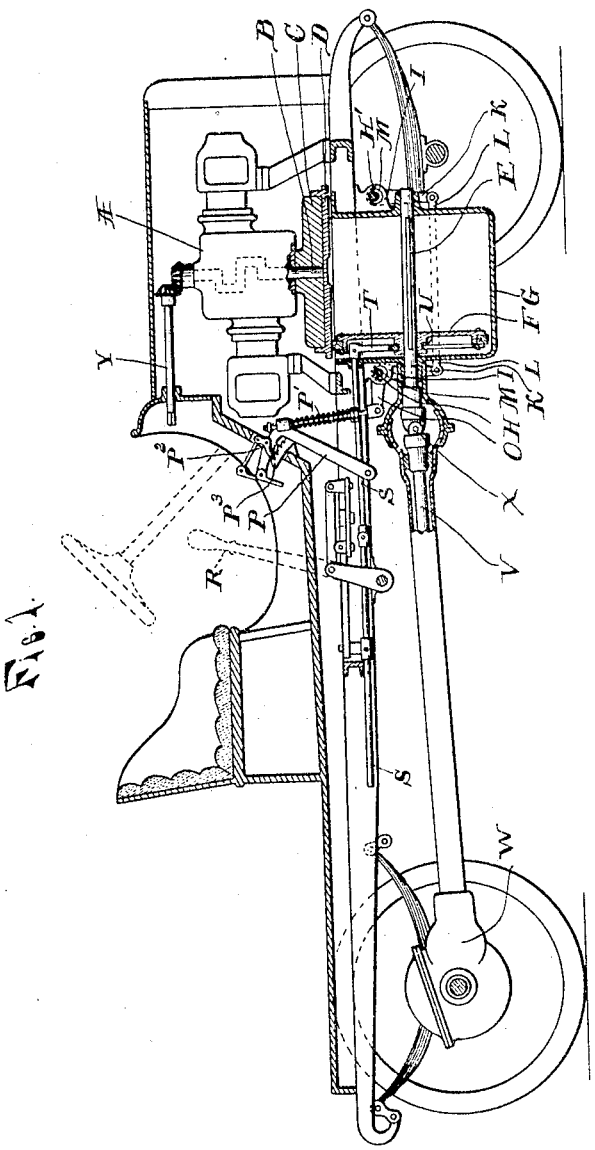
WITNESSES:
Anna M. Dow.
Anna M. Mayer.
INVENTOR
Joseph P. Lavigne
By Barthel & Barthel
Attorneys.

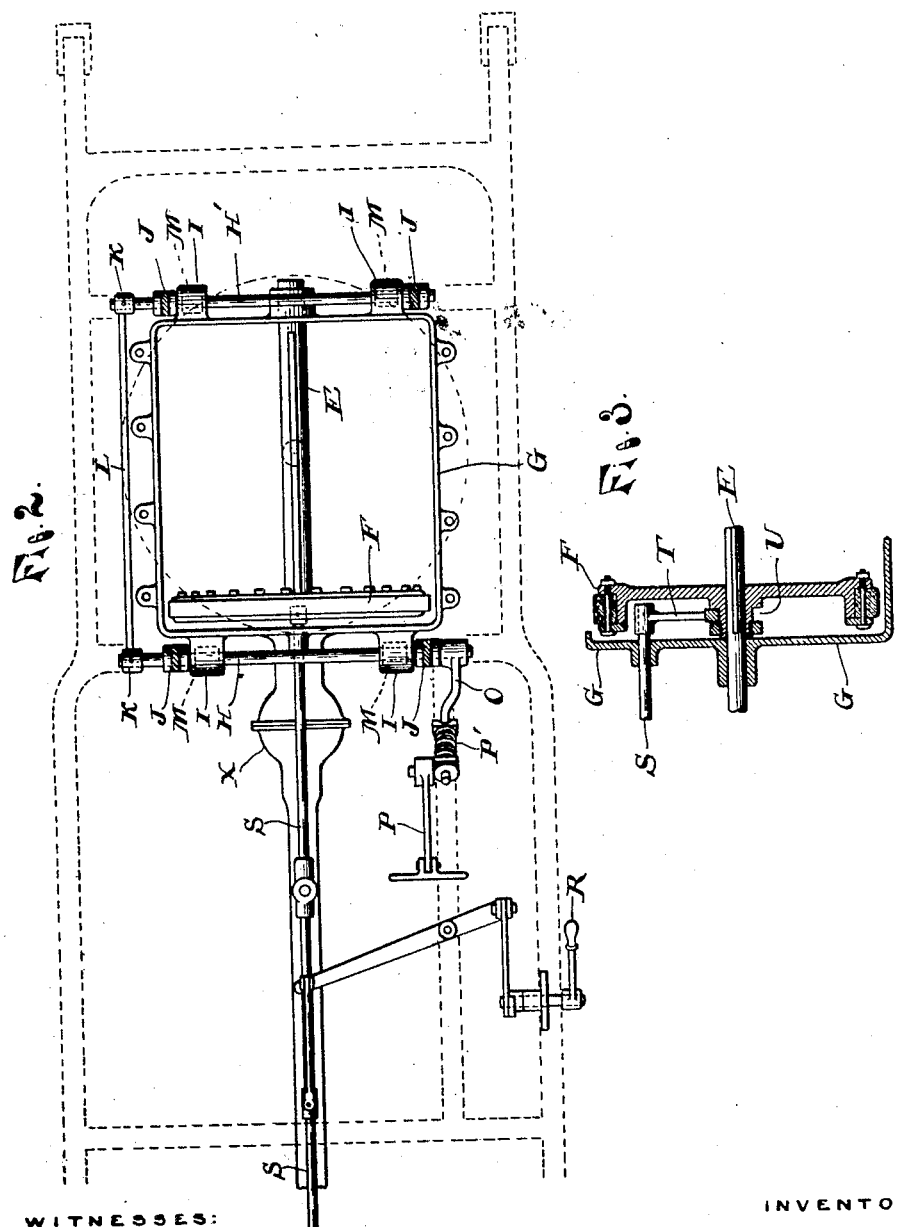

UNITED STATES PATENT OFFICE.

JOSEPH P. LAVIGNE, OF DETROIT, MICHIGAN, ASSIGNOR TO THE BLOMSTROM MANUFACTURING CO., OF DETROIT, MICHIGAN, A CORPORATION OF MICHIGAN.

MOTOR-VEHICLE-DRIVING MECHANISM.

No. 888,405.  Specification of Letters Patent.  Patented May 19, 1908.

Application filed June 12, 1907. Serial No. 378,674.

*To all whom it may concern:*

Be it known that I, JOSEPH P. LAVIGNE, a citizen of the United States of America, residing at Detroit, in the county of Wayne and State of Michigan, have invented certain new and useful Improvements in Motor-Vehicle-Driving Mechanism, of which the following is a specification, reference being had therein to the accompanying drawings.

This invention relates to driving mechanism in which variable speed frictional gearing is employed to transmit motion from the prime mover to the rear axle of the vehicle and the particular object of the invention is to accomplish this with a direct center drive, that is with driving mechanism in which all the parts are disposed in the longitudinal central line of the vehicle frame with the fly wheel of the engine as the driving member of the friction gearing.

To this end my invention embodies a novel arrangement of the parts whereby I accomplish the desired object in a very simple and effective manner, all as more fully hereinafter described.

Figure 1 is a sectional side elevation of a motor vehicle embodying the invention; Fig. 2 is a plan of the variable speed frictional gearing; and Fig. 3 is an enlarged vertical central section through the friction pulley.

In the drawings A is the prime mover which in this particular instance is a double opposed gasolene engine of known construction so mounted upon the forward end of the vehicle frame that the crankshaft B is in vertical position centrally of the frame and with the axis of the two cylinders in the same vertical, central, longitudinal plane. This does not involve any new departure in the construction of the engine, since the engine is merely laid on its side.

C is the fly wheel of the engine which in my construction constitutes the driving member of the frictional gearing; for practical reasons I preferably make the frictional face thereof to consist of a face disk D secured to the rim of the fly wheel and adjusted with its face in a plane at right angles to the crank shaft.

Below the flywheel is supported upon a longitudinal shaft E, the friction pulley F which is splined upon the shaft E and is adapted to travel thereon in frictional contact with the fly wheel.

The shaft E is journaled in the end walls of a housing G which is supported upon two transverse rock shafts H H' journaled in ears I formed or provided on the front and rear walls of the housing.

The transverse rock shafts H H' are supported in bearings J from the frame of the vehicle and they are connected for joint operation by means of crank arms K and a connecting rod L.

The transverse rock shafts carry eccentrics M which form the bearings thereof in the ears I all so arranged that by rocking the shafts the eccentrics raise and lower the housing the necessary amount to bring the friction pulley F in or out of frictional contact with the driving member.

Suitable means are provided for raising and lowering the friction pulley in and out of contact with the flywheel and for shifting it upon the shaft E for effecting the desired changes of speed and for reversing the motion.

As shown in the drawings the means for throwing the frictional pulley in and out of gear are actuated by means of a rock-arm O on the shaft H which is connected to a pedal lever P through the medium of the spring tension rod P' all so arranged that the operator by manipulating the pedal lever controls the raising and lowering of the friction pulley into or out of frictional contact with the driving member.

The pedal is pivotally secured to the pedal lever and carries a dog P² which is adapted to engage with a notched segment P³ for the purpose of locking the pedal lever in position, all of which is well known.

The shifting mechanism shown in the drawings is actuated by a hand lever R on the side of the vehicle frame; it is connected through intermediate mechanism with a shifting rod S slidingly supported in bearings in the longitudinal center of the frame. The forward end of the shifting rod is secured to a forked arm T which loosely engages with an annular groove U in the hub of the friction pulley, all so arranged that by actuating the hand lever the driver on his seat can shift the friction pulley along the shaft E and thus vary the speed as he may desire either in the forward or backward direction.

From the shaft E the motion is transmitted directly to the rear axle by providing the shaft E with a rear extension V which engages with the rear axle through the medium of compensating bevel gearing included within a casing W in the well known manner, suitable provision being made by means of a universal joint X or otherwise to provide for a free angular adjustment between the parts E and V of the driven shaft and all the exposed portions of the driven shaft may be inclosed in an outer jacket all of which is well understood and need not be further described.

My construction of drive mechanism presents many advantages. It places the parts which need frequent attention in accessible positions from above, these parts being all under the hood on the forward part of the vehicle frame with ample space to all the parts and leaving the space below the body free and clear. The friction disk bearing as it does with its weight upon the friction pulley is in the most favorable position for frictional transmission of power, besides it prevents the settlement of any oil, water or dust thereon which are the worst foes of frictional transmission.

From a constructive point of view the advantage of disposing the whole driving mechanism including the engine in the longitudinal center of the frame is well understood and this arrangement obviously presents the most favorable conditions for carrying the load under all conditions of running.

The upright position of the crank shaft does not involve the restriction in the style of engine or motor available for my purpose; the double opposed gasolene motor is however the one I prefer to adapt for the construction of a simple compact and moderately priced motor vehicle of the runabout type.

The upright position of the crank shaft enables me also to apply a very simple and convenient starting mechanism by means of a starting shaft Y located below the hood directly in front of the driver's seat and operating through bevel gear connections with the upper end of the crank shaft.

What I claim as my invention is:—

1. In a motor vehicle driving mechanism, the combination of a drive shaft actuated by the motor and supported in vertical bearings, a friction disk at the lower end of said shaft, a longitudinally disposed driven shaft below the drive shaft, positive drive connection between the rear end of said shaft and the rear axle, a frame in which a portion of said shaft below the friction disk is journaled, a friction pulley shiftable upon said portion of the shaft and adapted to rotate the same and means for raising and lowering the frame.

2. In a motor vehicle driving mechanism, the combination of a drive shaft supported in vertical bearings on the forward part of the vehicle frame and constituting the main shaft of the motor, a friction disk carried on the lower end of said drive shaft, a driven shaft extending longitudinally of the vehicle frame below said friction disk in a vertical plane with the drive shaft and vertically movable from and toward the friction disk, and a friction pulley splined upon the driven shaft and endwise movable thereon.

3. In a motor vehicle driving mechanism, the combination with the vehicle frame, of a motor carried upon the forward end of the frame and having its drive shaft disposed vertically, a friction disk on the drive shaft below the motor, a drive shaft extending longitudinally of the vehicle frame below the friction disk and movable from or toward the same and a friction pulley splined on said drive shaft and adapted to variably contact with the friction disk.

4. In a motor vehicle driving mechanism, a friction disk driven by the motor and rotating in vertical bearings upon the forward end of the vehicle frame, a driven shaft extending longitudinally of the frame below the drive shaft to the rear axle and in positive driving connection therewith and a friction pulley shiftably splined upon the portion of said shaft below the friction disk and adapted to contact the face thereof.

5. In a motor vehicle driving mechanism, the combination of a drive shaft supported in vertical bearings upon the forward end of the vehicle frame centrally thereof, a friction disk carried by said drive shaft, a drive shaft extending longitudinally of the vehicle frame and centrally thereof below said friction disk, bearings in which said drive shaft is supported movable from and toward the friction disk and a friction pulley shiftable upon said driven shaft and adapted to contact with the friction disk and transmit motion to the driven shaft.

6. In a motor vehicle driving mechanism, the combination of a drive shaft supported in vertical bearings upon the forward end of the vehicle frame centrally thereof, a friction disk carried on the lower end of said drive shaft extending longitudinally of the vehicle frame below the friction disk and supported movably from and toward the same, a friction pulley splined upon the drive shaft and adapted to traverse the face of the friction disk in contact therewith.

7. In a motor vehicle driving mechanism, the combination with the vehicle frame, and the seat mounted thereon, of an explosive engine mounted upon the vehicle frame forwardly of the seat and supported thereon with its crank shaft in vertical position and carrying its fly wheel at the lower end, said fly wheel forming the driving member of the driving mechanism, and starting mechanism including a manually operative shaft having actuating connection with the upper end of the crank shaft and extending rearwardly therefrom toward the seat, its rear end terminating in front of the seat within reach of the operator thereon.

8. In a motor vehicle driving mechanism, the combination with the vehicle frame, of a drive shaft supported in vertical bearings, a friction disk at the lower end of said shaft, a casing vertically movably supported from the vehicle frame below said friction disk, a driven shaft journaled in said casing longitudinally of the vehicle frame, and a friction pulley splined upon the driven shaft and shiftable within the casing in contact with the friction disk.

9. In a motor vehicle driving mechanism, the combination with the vehicle frame, of a drive shaft supported in vertical bearings, a friction disk at the lower end of said shaft, a driven shaft extending longitudinally below said friction disk, a friction pulley splined upon said driven shaft, a casing in which said pulley is shiftably inclosed and in which the driven shaft is journaled, transverse rock shafts journaled in bearings in the vehicle frame and movably supporting said casing from and toward the friction disk.

10. In a motor vehicle driving mechanism, the combination with the vehicle frame and body, of an explosive engine carried upon the frame forward of the driver's seat and supported thereon with its main shaft in vertical position, a fly wheel on the lower end of the main shaft adapted to form a friction disk, a casing vertically movably supported from the frame below the friction disk, a driven shaft passing through said casing in the longitudinal direction of the frame and vertically movable with the casing, a friction pulley splined upon the shaft and shiftable thereon within the casing across the face of the friction disk, a foot lever having actuating connection with the casing for raising and lowering the same and a shifting rod longitudinally guided in the frame in the vertical plane of the driven shaft and having actuating connection with the friction pulley for shifting the same upon the drive shaft and a hand lever having actuating connection with the friction pulley.

11. In a motor vehicle driving mechanism, the combination with the vehicle frame and rear axle, of an explosive engine mounted upon the forward end of the frame with its main shaft maintained in vertical position and with its fly wheel rotating in a horizontal plane at the lower end thereof, said fly wheel provided with a face forming a friction disk, a longitudinally disposed shaft below the main shaft having a front portion carrying a shiftable friction pulley and a rear portion extending to the rear axle and having power transmitting connection therewith, the front and rear portions being flexibly connected, and a casing suspended from the frame and vertically movable under control of the operator, said frame provided with bearings in which the front portion of the driven shaft is journaled and also forming an inclosing housing for the flywheel and friction pulley.

In testimony whereof I affix my signature in presence of two witnesses.

JOSEPH P. LAVIGNE.

Witnesses:
CLEMENT R. STICKNEY,
ANNA M. DORR.